United States Patent
Furumoto

(10) Patent No.: US 7,840,097 B2
(45) Date of Patent: Nov. 23, 2010

(54) AIDING APPARATUS, DESIGN AIDING METHOD, COMPUTER READABLE RECORDING MEDIUM RECORDED THEREON A DESIGN AIDING PROGRAM AND DESIGN AIDING SYSTEM

(75) Inventor: Yukihiko Furumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 965 days.

(21) Appl. No.: 11/701,450

(22) Filed: Feb. 2, 2007

(65) Prior Publication Data
US 2008/0077259 A1 Mar. 27, 2008

(30) Foreign Application Priority Data
Sep. 25, 2006 (JP) ............................. 2006-259212

(51) Int. Cl.
G06K 9/54 (2006.01)
G06K 9/46 (2006.01)

(52) U.S. Cl. ........................................ 382/305; 382/190

(58) Field of Classification Search ................. 382/154, 382/181, 203, 209, 218, 190, 305
See application file for complete search history.

(56) References Cited

U.S. PATENT DOCUMENTS

| | | | |
|---|---|---|---|
| 7,343,039 B2* | 3/2008 | Liu et al. | 382/170 |
| 7,363,103 B2* | 4/2008 | Takahashi et al. | 700/182 |
| 7,397,473 B2* | 7/2008 | Chakraborty | 345/419 |
| 2002/0097906 A1 | 7/2002 | Ishiyama | |
| 2004/0249809 A1* | 12/2004 | Ramani et al. | 707/4 |

FOREIGN PATENT DOCUMENTS

| | | |
|---|---|---|
| JP | 9-179892 | 7/1997 |
| JP | 2002-157595 | 5/2002 |

\* cited by examiner

*Primary Examiner*—Daniel G Mariam
(74) *Attorney, Agent, or Firm*—Fujitsu Patent Center

(57) ABSTRACT

An apparatus comprises a retrieving unit calculating a degree of similarity of each of the plural pieces of feature information about the respective plural registered components extracted by a first extracting unit to the piece of feature information about the structural component extracted by a second extracting unit, and retrieving a registered component whose calculated degree of similarity is not less than a predetermined degree as a similar component of the structural component. Even if shape information about a component to be newly added to design data of a structure is in a form that is difficult to be used as the design data, it is possible to easily add the shape information about the component in a form that is usable as the design data to the design data.

17 Claims, 11 Drawing Sheets

AIDING APPARATUS, DESIGN AIDING METHOD, COMPUTER READABLE RECORDING MEDIUM RECORDED THEREON A DESIGN AIDING PROGRAM AND DESIGN AIDING SYSTEM

BACKGROUND OF THE INVENTION

1) Field of the Invention

The present invention relates to a technique for preparing design data of a structure to be used by CAD (Computer Aided Design). Particularly, the present invention relates to a technique for newly adding information about a component to design data of a structure.

2) Description of the Related Art

Heretofore, components [for example, screw, bolt, nut, connector, electronic component (for example, LSI (Large Scale Integration) chip); hereinafter, referred to as library components], which have general-purpose properties and are used in common in design of various products (structures), are generally purchased as ready-made goods and used. However, there often occurs a case where real things of the library components exist but do not exist as shape information (CAD data) used in design.

In design of a product, it is general to define a shape of a component or assembly of a product by referring to the library components, it is thus necessary that shape information about each of the library components are included in design data (hereinafter, referred to as CAD data) of a product.

For design verification in a stage before a prototype is manufactured, it is necessary that the library components exist in CAD data as shape information usable in the verification.

For this reason, shape information (non-CAD data) may be obtained from a real thing of a library component by using a 3D (Three-Dimensional) scanner, and the shape information in a form different from that of the obtained CAD data may be used in design or verification.

As 3D scanners, there are some types, one of which measures a surface of a component in various ways and represents a shape of the component with groups of points obtained in the measuring, another of which represents a shape of a component by surfaces obtained by connecting adjacent point groups after the point groups are obtained, and so on.

Other than the technique using a 3D scanner, it is considered that when shape information in a form, which is different from that of CAD data, about a library component is obtained from a distributor of the library component, the obtained shape information is used in design or in verification.

In order to facilitate design of a structure, there has been proposed a technique that inputs data relating to attributes or shape features of a required component, and retrieves a similar standard component or a similar example component from a database of standard components in which the attributes of a required specification and parametric dimensions of CAD are continuously corrected by restrictions, or a database of example components prepared in the past (refer to a Patent Document 1 below, for example).

As another technique using a three-dimensional shape of an object, there has been proposed a technique that performs collation determination using a three-dimensional shape or reflectivity of a surface of an object to be collated when the object is collated by using an image (refer to Patent Document 2, for example).

However, shape information or the like obtained by a 3D scanner is not in a form unusable in CAD but in a form in which information necessary in CAD (for example, reference surface or coordinate system) is undefined (is not included), although it represents a shape. Therefore, the shape information or the like obtained by a 3D scanner is difficult to be used as it is in actual design (CAD) as shape information representing a shape of a component.

In the case where it is expressed that a certain surface of a library component is matched with a surface of another component, it is impossible to define that the surface of the library component is matched with the surface of another component because the shape information does not include "surface" that is defined in CAD data when shape information of the library component obtained by a 3D scanner is point group data.

When shape information of a library component obtained by a 3D scanner represents a shape formed by a surface made by connecting adjacent point groups, a surface, which is originally flat, does not often become a flat surface because of error or the like in measurement. In such case, a definition that a certain surface of a library component is matched with a surface of another component is extremely difficult.

To use shape information representing a shape of a component in CAD, presence of a virtual reference surface or coordinate system, which that does not exist as a shape of the component, is important for the shape information. But, such definition is not included in the shape information or the like obtained by a 3D scanner.

As above, even if information or the like obtained by a 3D scanner is included in CAD data, it is impossible to generate CAD data to be used in design or in verification by using such information or the like.

Heretofore, even when shape information about a library component that the designer (operator) desires to add to CAD data of a product is read by a 3D scanner, the designer (operator) has to newly prepare, manually, shape information (for example, CAD data itself) in a form usable in CAD about the library component while confirming a shape or specification of the library component, and add it to the CAD data of the product.

Accordingly, much work or a number of steps of the work are heretofore required to newly add shape information about a library component to CAD data.

Even in the above-mentioned technique disclosed in Patent Document 1, the designer has to directly input data relating to attributes or shape features of a library component while referring to information or the like obtained by reading the library component by a 3D scanner, or specification information about the library component, which leads to an increase in labor or an increase in the number of steps of the work.

[Patent Document 1] Japanese Patent Laid-Open No. HEI09-179892

[Patent Document 2] Japanese Patent Laid-Open No. 2002-157595

SUMMARY OF THE INVENTION

In the light of the above drawbacks, an object of the present invention is to be able to readily add shape information about a component in a form usable as design data to design data of a structural, even if the shape information about the component is in a form that is difficult to be used as design data.

Therefore, the present invention provides a design aiding apparatus comprising a retaining unit for retaining plural pieces of shape information in a first form about respective plural registered components which may constitute a structure, a first extracting unit for extracting plural pieces of feature information from the plural pieces of shape information in the first form about the plural registered components, respectively, retained in the retaining unit, an obtaining unit for obtaining a piece of shape information in a second form, which is different from the first form, about a structural component constituting the structure, a second extracting unit for extracting a piece of feature information from the piece of shape information in the second form about the structural component obtained by the obtaining unit, and a retrieving unit for calculating degrees of similarity of each of the plural pieces of feature information about the respective registered components extracted by the first extracting unit to the piece of feature information about the structural component extracted by the second extracting unit, and retrieving a registered component whose calculated degree of similarity is equal to or larger than a predetermined degree as a similar component of the structural component.

It is preferable that the design aiding apparatus further comprises a changing unit for changing a piece of shape information about the similar component retrieved by the retrieving unit and a registering unit registering the piece of shape information about the similar component changed by the changing unit in the retaining unit.

The present invention further provides a design aiding method comprising the steps of a first extracting step of extracting plural pieces of feature information from plural pieces of shape information in a first form about a plurality of registered components, respectively, in a retaining unit retaining the plural pieces of shape information in the first form about the respective plural registered components which may constitute a structure, an obtaining step of obtaining a piece of shape information in a second form about a structural component which constitutes the structure, a second extracting step of extracting a piece of feature information from the shape information in the second form about the structural component obtained at the obtaining step, and a retrieving step of calculating degrees of similarity of each of the plural pieces of feature information about the respective plural registered components extracted at the first extracting step to the piece of feature information about the structural component extracted at the second extracting step, and retrieving a registered component whose calculated degree of similarity is equal to or larger than a predetermined degree as a similar component of the structural component.

The present invention still further provides a computer readable recording medium recorded thereon a design aiding program making a computer realize a function of retrieving a registered component similar to a structural component constituting a structure from a retaining unit retaining plural pieces of shape information in a first form about respective plural registered components which may constitute the structure, the design aiding program making the computer function as a first extracting unit for extracting plural pieces of feature information from the plural pieces of shape information in the first form about the plural registered components, respectively, retained in the retaining unit, an obtaining unit for obtaining a piece of shape information in a second form, which is different from the first form, about a structural component constituting the structure, a second extracting unit for extracting a piece of feature information from the piece of shape information in the second form about the structural component obtained by the obtaining unit, and a retrieving unit for calculating degrees of similarity of each of the plural pieces of feature information about the respective registered components extracted by the first extracting unit to the piece of feature information about the structural component extracted by the second extracting unit, and retrieving a registered component whose calculated degree of similarity is equal to or larger than a predetermined degree as a similar component of the structural component.

The present invention still further provides a design aiding system comprising a generating apparatus for generating a piece of shape information about a structural component constituting a structure, and the above-described design aiding apparatus for preparing design data of the structure by using the piece of shape information about the structural component generated by the generating apparatus.

According to this invention, the first extracting unit extracts a piece of feature information from a piece of shape information in the first form about each of a plurality of registered components retained in the retaining unit, the second extracting unit extracts a piece of feature information from a piece of shape information in the second form about a structural component obtained by the obtaining unit, the retrieving unit calculates a degree of similarity of the piece of feature information about each of the plural registered component extracted by the first extracting unit to the piece of feature information about the structural component extracted by the second extracting unit, and retrieves a registered component whose degree of similarity is equal to or larger than a predetermined degree as a similar component of the structural component, as above. Even if the second form of the shape information about the structural component to be newly added to design data of the structure is difficult to be used in computer aided design (that is, one generated by a 3D scanner), it is possible to allow the shape information about the structural component to have the first form that is usable in the computer aided design, and be added to the design data, with ease, by using the shape information about the registered component retrieved as the similar component by the retrieving unit.

Namely, the first extracting unit and the second extracting unit extract two pieces of feature information that are comparable with each other from a piece of shape information in the first form and a piece of shape information in the second form, which are different from each other, respectively. Accordingly, the retrieving unit can retrieve a registered component in the first form similar to or agreeing with the structural component in the second form as a similar component on the basis of these two pieces of feature information. When the retrieved similar component matches the structural component, shape information in the first form about the similar component is added as it is to the design data, whereby the shape information in the first form agreeing with a shape of the structural component in the second form can be included in the design data. When the retrieved similar component is similar to the structural component, it is possible to add shape information about the similar component as it is to the design data if a little difference is allowed because of properties or an application of the design data, or characteristics or the like of the structural component, whereby a shape similar to that of the structural component in the second form can be added as in the first form to the design data. When the shape information about the retrieved similar component cannot be added to the design data unless it is changed, the shape information on the similar component is changed to agree with the shape of the structural component, then added to the design data. As this, it is possible to allow shape information in the first form agreeing with a shape of the structural component in the second form to be included in the design data with less labor or a less number of steps of work than the known techniques described above.

The changing unit changes the shape information about the retrieved similar component to match the shape of the similar component about which shape information has been changed by the changing unit with the shape of the structural component. Whereby, it is possible to readily add the shape information in the first form agreeing with the shape of the structural component in the second form to the design data. Further, the registering unit registers the shape information about the similar component changed by the changing unit in the retaining unit, whereby the contents of the retaining unit can be enriched, which leads to improvement of the rate of retrieval of a similar component by the retrieving unit, and the accuracy of the retrieval [namely, it is possible to improve the degree of similarity (degree of agreement) of the retrieved similar component].

DESCRIPTION OF THE PREFERRED EMBODIMENTS

Hereinafter, description will be made of an embodiment of the present invention with reference to the drawings.

[1] Embodiment of the Invention

Figure 1:
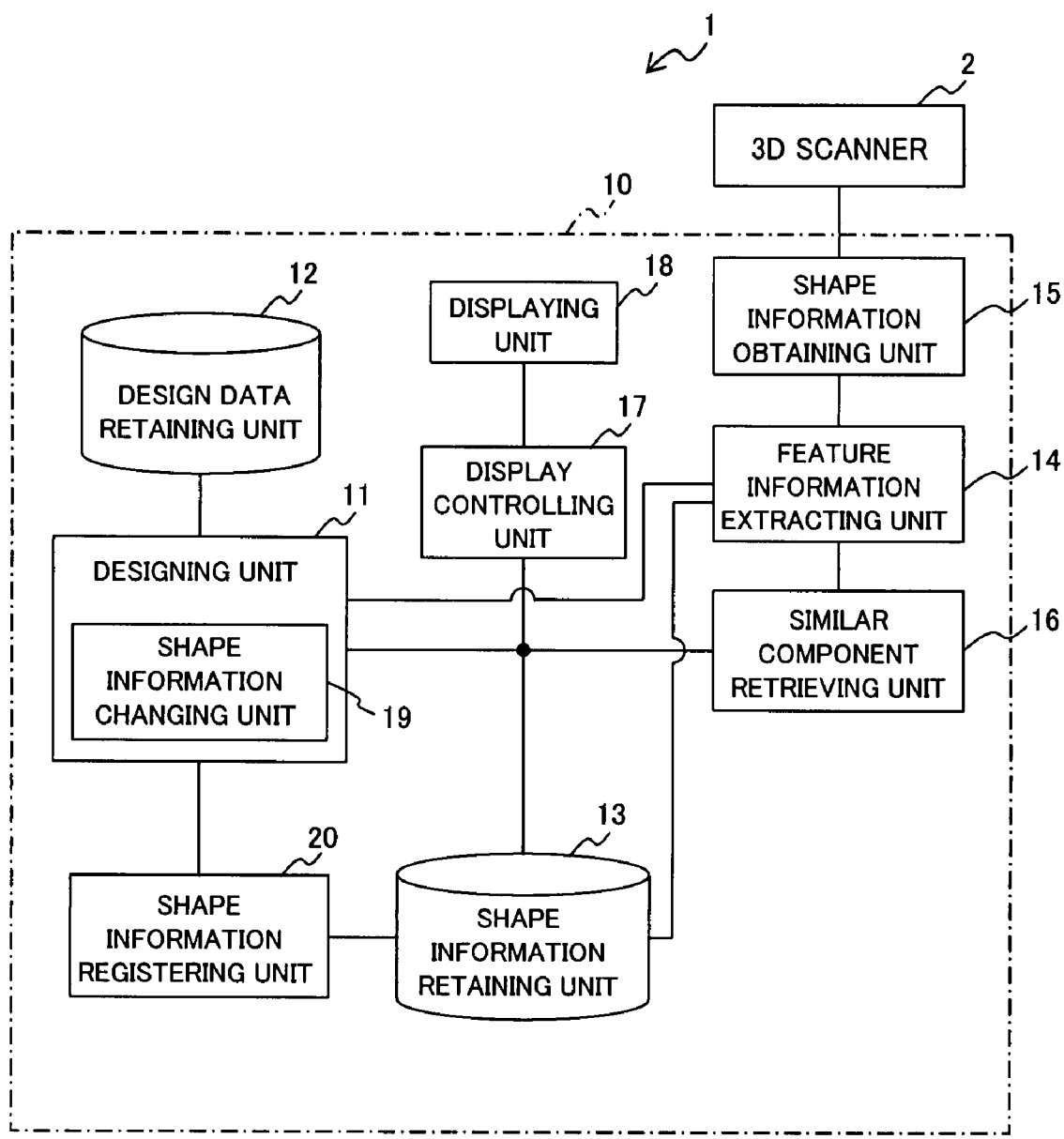
FIG. 1 is a block diagram showing a structure of a design aiding system according to an embodiment of this invention.

First, description will be made of a structure of a design aiding system (similar shape preparation aiding system) 1 as an embodiment of the present invention with reference to a block diagram shown in FIG. 1. As shown in FIG. 1, the design aiding system [CAD (Computer Aided Design) system] 1 comprises a 3D scanner (generating apparatus) 2 generating shape information representing a three-dimensional shape of a component, and a design aiding apparatus 10 preparing design data (three-dimensional design data; hereinafter, referred to as CAD data) of a structure consisting of a plurality of components.

The 3D scanner 2 generates shape information about a component (for example, a library component) to be added to design data of a structure prepared by the design aiding apparatus 10, as described above. For example, the 3D scanner 2 measures surfaces of a component in one of various methods, and generates shape information representing a shape of the component with point groups obtained by measurement, or generates shape information representing a shape of the component with surfaces obtained by connecting adjacent point groups.

Accordingly, a form of the shape information generated by the 3D scanner is different from that of CAD data prepared by a designing unit 11 to be described later of the design aiding apparatus 10, which is unusable or is difficult to be used in computer-aided design by the design aiding apparatus 10.

More concretely, the form of the shape information generated by the 3D scanner 2 is a form (second form) in which information necessary in computer-aided design (for example, reference surface or coordinate system) is undefined.

The design aiding apparatus 10 comprises the designing unit 11, a design data retaining unit 12, a shape information retaining unit (retaining unit) 13, a feature information extracting unit (first extracting unit, second extracting unit) 14, a shape information obtaining unit (obtaining unit) 15, a similar component retrieving unit (retrieving unit) 16, a display controlling unit 17, a displaying unit 18, a shape information changing unit (changing unit) 19 and a shape information registering unit (registering unit) 20.

Figure 2:
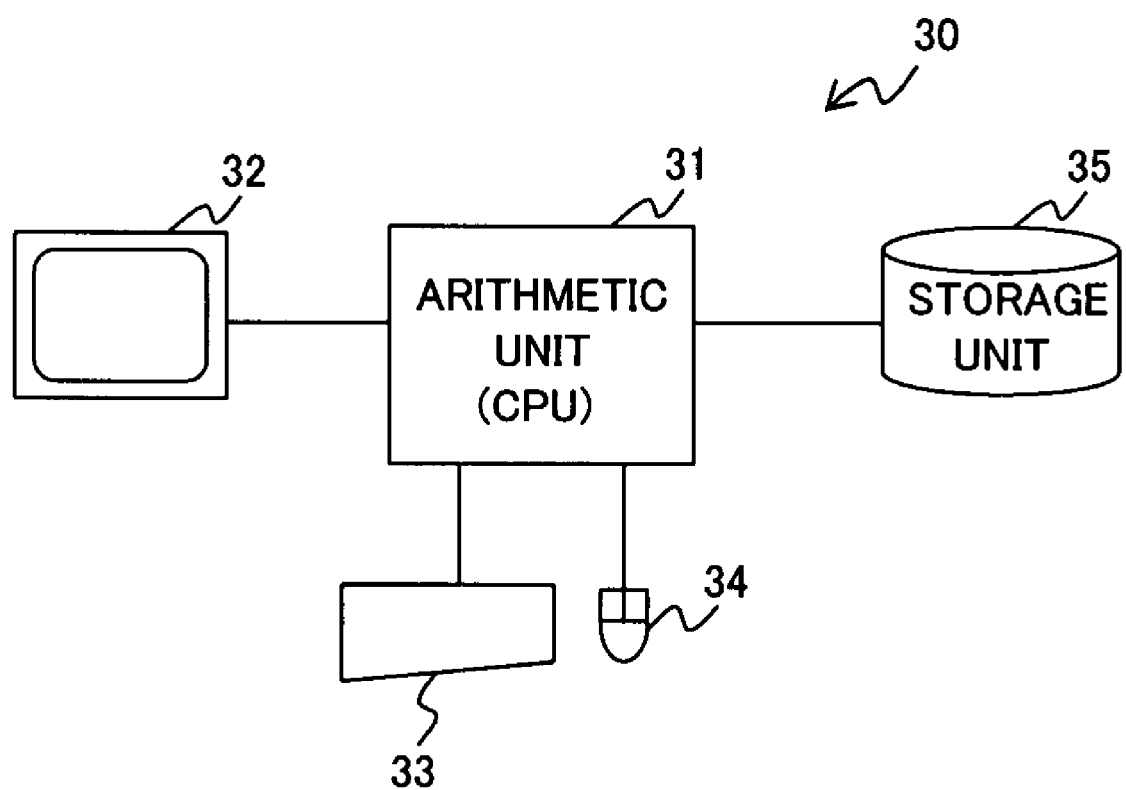
FIG. 2 is a block diagram showing an example of a structure of a computer with which a design aiding apparatus of the design aiding system according to the embodiment of this invention is realized.

The design aiding apparatus 10 is realized with a computer 30 having an arithmetic unit (for example, CPU: Central Processing Unit) 31, a monitor 32, a keyboard 33 and a mouse 34, which are input interfaces, and a storage unit 35, as shown in FIG. 2, for example.

Namely, the design data retaining unit 12 of the design aiding apparatus 10 is realized with the storage unit 35, the displaying unit 18 is realized with the monitor 32, and the designing unit 11, the feature information extracting unit 14, the shape information obtaining unit 15, the similar component retrieving unit 16, the display controlling unit 17, the shape information changing unit 19 and the shape information registering unit 20 are realized by executing a predetermined application program (design aiding program to be described later) by the arithmetic unit 31.

The shape information retaining unit 13 maybe realized with the storage unit 35 or with a memory (not shown) equipped to the arithmetic unit 31, for example.

Figure 3:
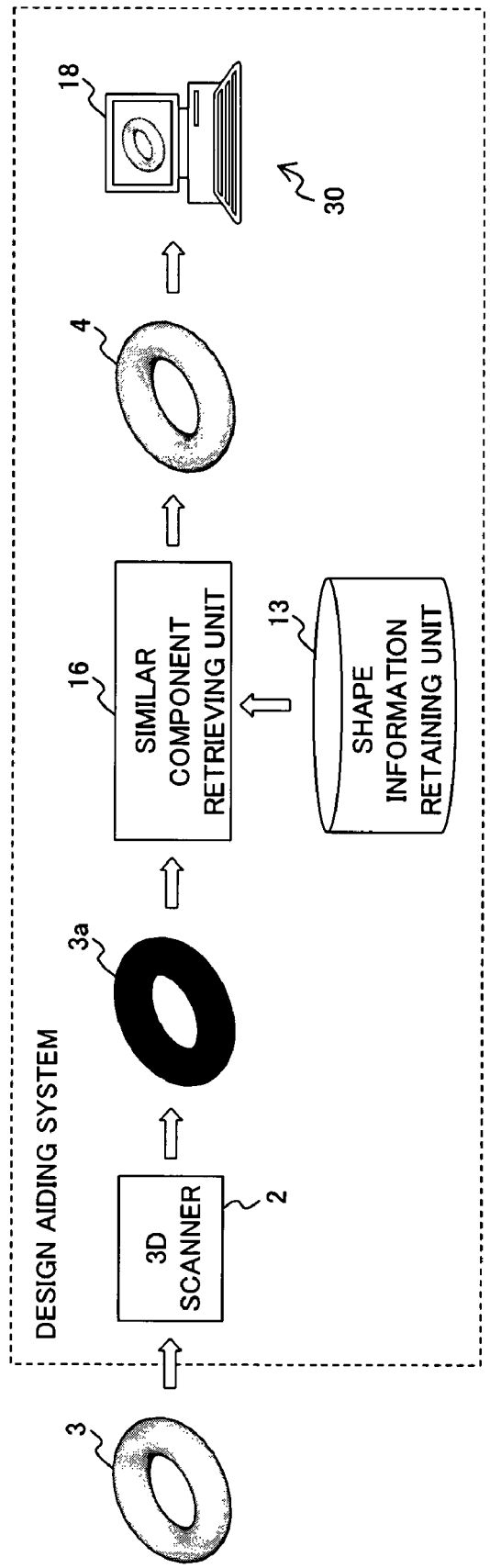
FIG. 3 is a diagram showing a procedure of a main process by the design aiding system according to the embodiment of this invention.

Now, outline of a process performed by the design aiding system 1 will be described with reference to FIG. 3. FIG. 3 is a diagram showing a procedure of a main process of the design aiding system 1, where the process proceeds from the left side to the right side in the drawing.

The design aiding system 1 is to newly add design data (shape information) of a component (structural component) 3 to design data of a structure prepared (retained) by the design aiding apparatus 10. A 3D scanner 2 first samples a structural component 3 desired to be added, and generates shape information 3a in a second form different from the form of CAD data.

Next, the similar component retrieving unit 16 of the design aiding apparatus 10 retrieves, on the basis of the sampled shape information, a registered component 4 similar to the structural component 3 among a plurality of components (registered components; for example, library components) about which shape information (CAD data) is beforehand retained in the shape information retaining unit 13.

The design aiding apparatus 10 (display controlling unit 17) outputs the registered components 4 retrieved as above to the designer (operator of the design aiding apparatus 10; hereinafter, referred to as operator) by displaying the registered component 4 on the displaying unit 18, for example.

When the registered component 4 retrieved matches or roughly matches the structural component 4, the designing unit 11 allows the shape information about the registered component 4 to be included as it is in the CAD data of the structure according to an instruction of the operator. When the registered component 4 retrieved is similar to the structural component 3 but is difficult to be used unless it is changed, the shape information changing unit 19 of the designing unit 11 changes the size and/or shape of the registered component 4 to match the registered component 4 to the structural component 3, the designing unit 11 then allows it to be included in the CAD data of the structure.

As above, the design aiding apparatus 10 of the design aiding system 1 permits shape information in a second form, which is different from that of design data of the structure relating to the structural component 3, to have the first form and be added to the design data.

Next, each of the constitutional elements of the design aiding apparatus 10 will be described in more detail with reference to FIG. 1.

The designing unit 11 designs a structure according to an instruction of the operator inputted through, for example, the keyboard 33 or the mouse 34 as being an input interface, thereby preparing three-dimensional CAD data.

The design data retaining unit 12 retains the CAD data of the structure prepared by the designing unit 11.

The shape information retaining unit 13 retains plural pieces of shape information representing shapes (here, three-dimensional shapes) of a plurality of registered components, respectively, which may configure the structure. The shape information retaining unit 13 retains the shape information in a form that is usable in computer-aided design (that is, a form that not only merely allows the shape information to be included in design data but also allows the shape or the like to be changeable in the computer aided-design), that is, in a form (first form) including information necessary in computer-aided design. Incidentally, the shape information retaining unit 13 retains shape information in a form similar to that of CAD data prepared by the designing unit 11.

The plural registered components about which plural pieces of shape information are retained by the shape information retaining unit 13 are preferably components having versatility (for example, screw, bolt, nut, connector, electronic component [for example, LSI (Large Scale Integration) chip]) and used in common in design of various structures, or components which are not designed by the designing unit 11 but purchased as ready-made articles.

The shape information retaining unit 13 retains plural pieces of shape information about the respective plural registered components and plural pieces of feature information extracted from the respective pieces of the shape information by the feature information extracting unit 14, wherein the plural pieces of the shape information are correlated to the plural pieces of the feature information, respectively.

The feature information extracting unit 14 functions as a first extracting unit that extracts feature information representing a feature of a shape shown by the shape information from the shape information retained by the shape information retaining unit 13, and also functions as a second extracting unit extracting feature information representing a feature of a shape from shape information about a structural component that is to be added to CAD data of the structure generated by the 3D scanner 2 and obtained by the shape information obtaining unit 15.

In other words, the feature information extracting unit 14 extracts (calculates) different sorts of feature information, which are comparable with each other on the basis of the same reference, from the shape information in the first form about each of the registered components retained in the shape information retaining unit 13 and the shape information in the second form about a structural component generated by the 3D scanner 2 and obtained (inputted) by the shape information obtaining unit 15.

Figure 4:
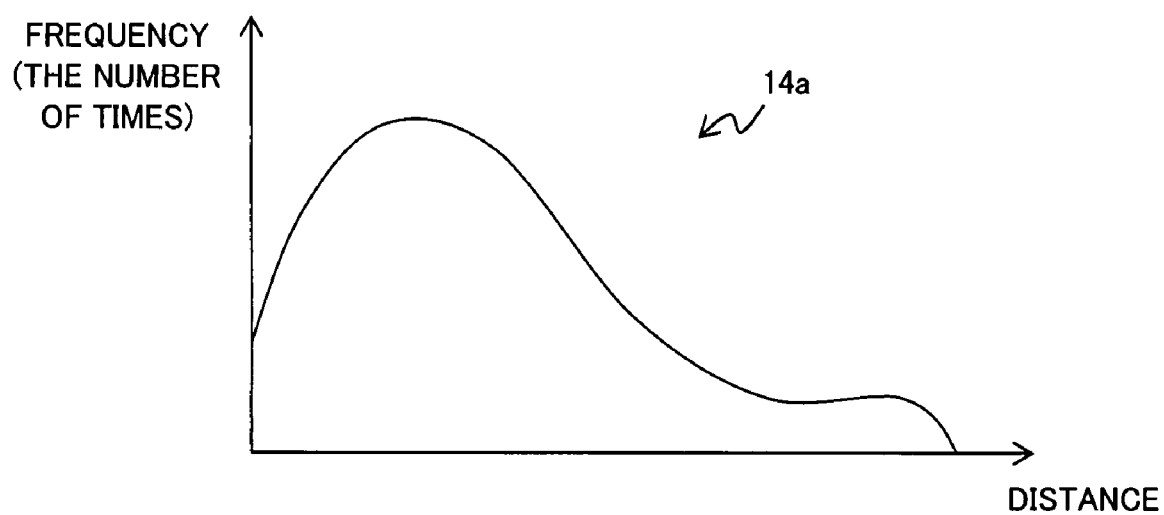
FIG. 4 is a diagram showing an example of feature information extracted from shape information about a component by a feature information extracting unit of the design aiding apparatus of the design aiding system according to the embodiment of this invention.

A method of the feature information extracting process by the feature information extracting unit 14 is not limited in this invention, and the extracted feature information itself is not limited, as well. For example, the feature information extracting unit 14 extracts a histogram 14a shown in FIG. 4 as the feature information in a method like "Shape Distributions" by "Princeton Shape Retrieval and Analysis Group" disclosed in the Internet (URL: http://www.cs.princeton.edu/gfx/proj/shape/).

Namely, the feature information extracting unit 14 extracts, as the feature information, the histogram 14a (frequency distribution of distances) which is obtained by repetitively executing, a predetermined number of times, a process of extracting arbitrary two points on a shape represented by the shape information in the first form or the second form and calculating a distance between the two points.

The feature information extracting unit 14 may extract the feature information in a known method such as Slice-based method (for example, refer to Pu Jiantao, Liu Yi, Xin Guyu, Zha Hongbin, Liu Weibin, Yusuke Uehara, "3D Model Retrieval Based on 2D Slice Similarity Measurements," 3dpvt, pp. 95-101, Second International Symposium on 3D Data Processing, Visualization and Transmission (3DPVT '04), 2004, or the Internet (URL: http://csdl2.computer.org/persagen/DLAbsToc.jsp?r esorucePath=/dl/proceedings/&toc=comp/proceedings/3dpvt/2004/2223/00/2223toc.xml&DOI=10.1109/TDPVT.2004.1335181), or Spherical Harmonics method [for example, refer to Michael Kazhdan and Thomas Funkhouser, "Harmonic 3D shape Matching," SIGGRAPH 2002 Technical Sketches, p. 191, July, 2002, or the Internet (URL: http://www.cs.princeton-.edu/gfx/proj/shape/s2002_kazhdan_ts.pdf)], other than the above Shape Distributions [for example, refer to Robert Osada, Thomas Funkhouser, Bernard Chazelle, and David Dobkin, "Shape Distributions," ACM Transactions on Graphics, 21(4), pp. 807-832, October 2002, or the Internet (URL: http://www.cs.princeton.edu/~funk/tog02.pdf)].

The shape information obtaining unit 15 obtains the shape information about a structural component constituting a structure in the second form from the 3D scanner 2.

The similar component retrieving unit 16 calculates a degree of similarity of feature information extracted by the feature information extracting unit 14 relating to shape information about a structural component obtained by the shape information obtaining unit 15 and extracted by the feature information extracting unit 14 to each of plural pieces of feature information extracted by the feature information extracting unit 14 relating to shape information about each of the plural registered components retained in the shape information retaining unit 13, and retrieves a registered component whose degree of similarity calculated is not less than a predetermined degree as a similar component of the structural component.

Figure 5:
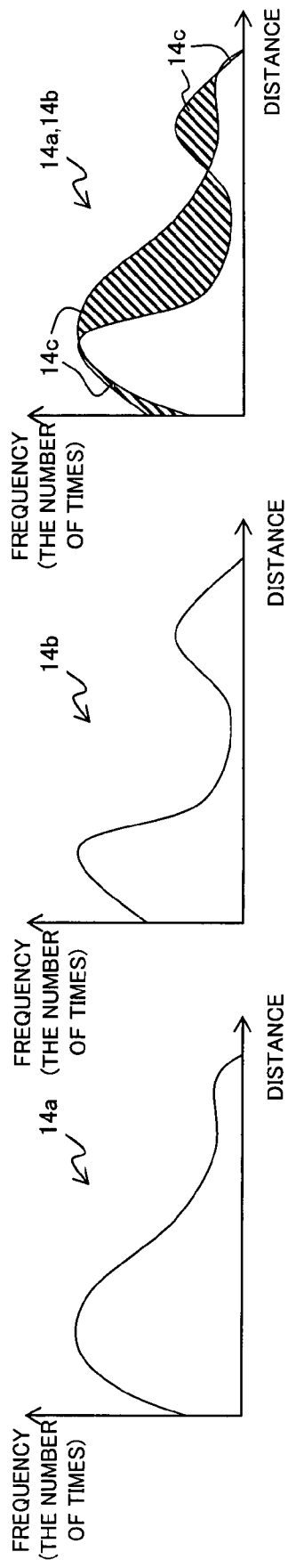
FIGS. 5(a) through 5(c) are diagrams for illustrating an example of a process by a similar component retrieving unit of the design aiding apparatus of the design aiding system according to the embodiment of this invention; where 5(a) is a diagram showing feature information extracted from shape information about a registered component by the feature information extracting unit, 5(b) is a diagram showing feature information extracted from shape information about a structural component by the feature information extracting unit, and 5(c) is a diagram for illustrating a degree of similarity calculated by the similar component retrieving unit.

As shown in FIGS. 5(a) and 5(b), when the feature information extracting unit 14 extracts the histogram 14a as feature information about a registered component and a histogram 14b as feature information about a structural component by using shape distributions, for example, the similar component retrieving unit 16 calculates a reciprocal (or a product a reciprocal of a difference 14c between the areas and a coefficient) of a difference 14c (refer to a portion shown by slanting lines in the drawing) between areas of these histograms 14a and 14b as a degree of similarity of the registered component to the structural component, as shown in FIG. 5(c). Note that when the difference 14c between the areas is "0", the similar component retrieving unit 16 calculates, for example, a maximum degree set beforehand as the degree of similarity so that the registered component is retrieved as one agreeing with the structural component (a similar component having the greatest degree of similarity). If the difference 14c between the areas is smaller (that is, if the registered component is more similar to the structural component), the degree of similarity calculated as above is a larger value in proportion. To the contrary, if the difference 14c between the areas is larger [that is, if the registered component is less similar to the structural component (more non-similar)], the degree of similarity is of a smaller value in proportion.

In order to compare the histogram 14a with the histogram 14b, the feature information extracting unit 16 extracts arbitrary two points on a shape represented by shape information on each of the histogram 14a and the histogram 14b, and repeats a process of calculating a distance between these two points the same number of times to generate the histograms 14a and 14b.

The similar component retrieving unit 16 determines whether a reciprocal of a value (area) of the area difference 14c as being the degree of similarity is not less than a threshold degree beforehand set, and retrieves a registered component whose degree of similarity is not less than the threshold degree (that is, similar to or agrees with the structural component) as a similar component of the structural component from the shape information retaining unit 13.

Namely, the similar component retrieving unit 16 executes the above process on every registered component retained in the shape information retaining unit 13, and retrieves all registered components whose calculated degree of similarity are not less than the predetermined degree as similar components of the structural component.

The display controlling unit 17 controls contents of display on the displaying unit 18. The display controlling unit 17 displays design data retained in the design data retaining unit 12 or design data under design by the designing unit 11, or shape information retained in the shape information retaining unit 13 on the displaying unit 18, and displays similar components of the structural component retrieved by the similar component retrieving unit 16 together with the structural component on the displaying unit 18. As this, the display controlling unit 17 and the displaying unit 18 together function as an outputting unit which outputs similar components retrieved by the similar component retrieving unit 16 to the outside.

More concretely, when the similar component retrieving unit 16 retrieves a plurality of similar components of the structural component from the shape information retaining unit 13, the display controlling unit 17 displays, along with the structural component, a retrieval result screen 17a on which a plurality of retrieved similar components (registered components) are arranged in the order of the degree of similarity (the first to ninth in FIG. 6) on the displaying unit 18.

The operator can readily recognize the retrieved similar components arranged in the order of the degree of similarity by referring to the retrieval result screen 17a displayed on the displaying unit 18, and determine/select a registered component determined by the operator as the most similar one among them as a final similar component.

Selection of the final similar component by the operator is executed by that the operator operates the mouse 34 to move a pointer on the retrieval result screen 17a onto the final similar component, and clicks the mouse 34.

When the selected similar component matches or approximately matches the structural component, or when the selected similar component similar to the structural component is allowed to have a little difference because of an application or properties of the CAD data or characteristics of the structural component, for example, the designing unit 11 adds shape information about the similar component without a change to CAD data of the structure retained in the design data retaining unit 12. When the selected similar component cannot be added to the CAD data unless it is changed, the shape information changing unit 19 changes the size or shape of the similar component, and the designing unit 11 adds the changed shape information about the similar component to the CAD data of the structure.

Namely, the shape information changing unit 19 changes shape information about a similar component retrieved by the similar component retrieving unit 16. More concretely, the shape information changing unit 19 changes the shape of a similar component selected as a final similar component by the operator according to an instruction of the operator inputted through the keyboard 33 or the mouse 34 so that the shape of the similar component agrees with the shape of the structural component.

The shape information registering unit 20 newly registers shape information in the first form in the shape information retaining unit 13. The shape information registering unit 20 registers shape information about a component designed by the designing unit 11 or shape information (here, CAD data) about a component changed by the shape information changing unit 19 in the shape information retaining unit 13.

In the design aiding apparatus 10, when the shape information registering unit 20 registers shape information about a new component in the shape information retaining unit 13, the feature information extracting unit (first extracting unit) 14 extracts feature information from the shape information about the component to be newly registered, correlates the extracted feature information to the shape information, and registers them in the shape information retaining unit 13.

Figure 7:
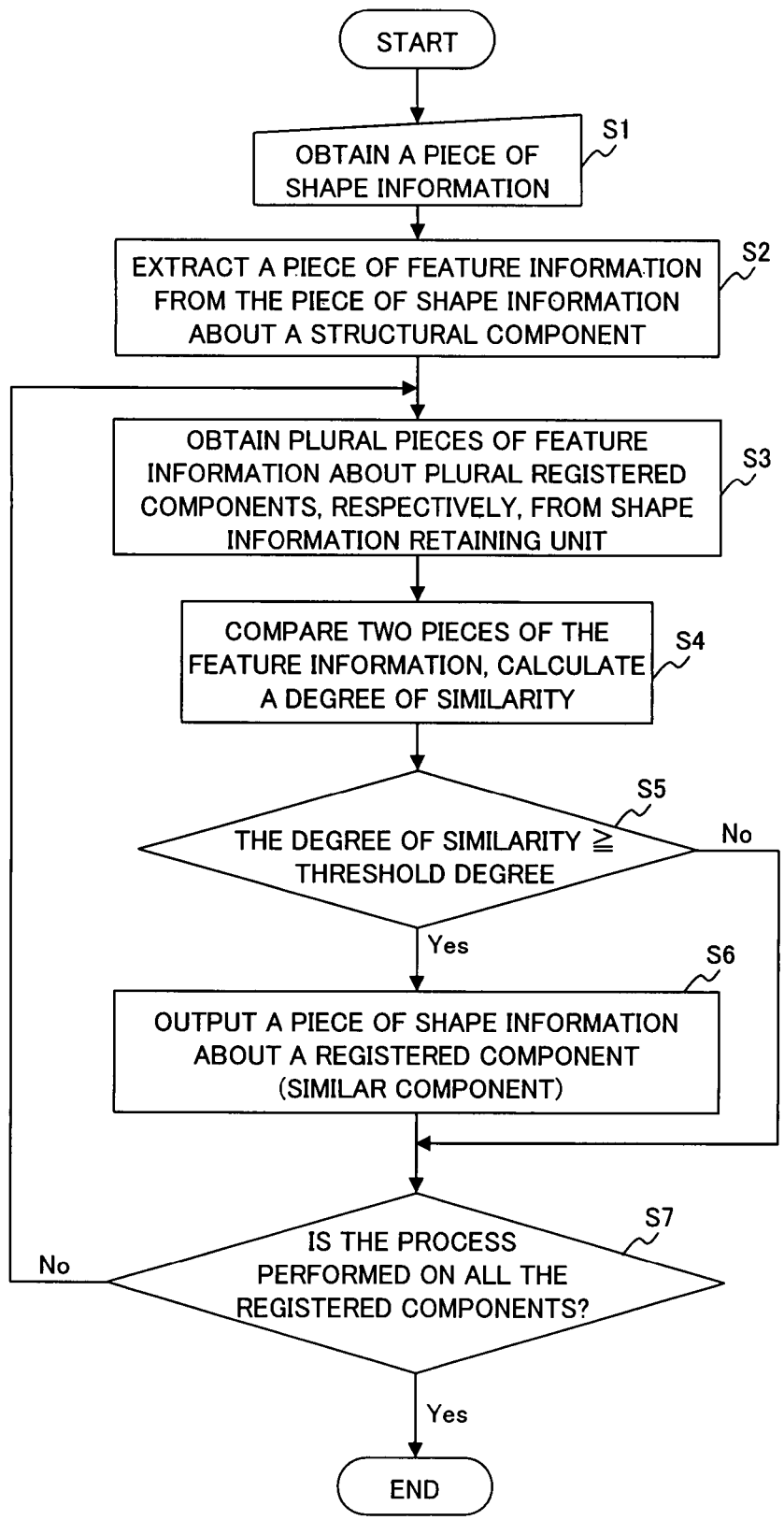
FIG. 7 is a flowchart showing a procedure of an operation in a design aiding method according to the embodiment of this invention.

Now, a procedure of an operation (design aiding method of this invention) of the design aiding apparatus 10 will be described with reference to a flowchart (steps S1 to S7) shown in FIG. 7. When the 3D scanner 2 generates shape information in the second form about a structural component (generating step; not shown), the shape information obtaining unit 15 obtains a piece of shape information in the second form about the structural component (step S1; obtaining step).

Next, the feature information extracting unit 14 extracts a piece of feature information from the piece of shape information in the second from obtained by the shape information obtaining unit 15 (step S2; second extracting step).

The similar component retrieving unit 16 obtains plural pieces of feature information relating to plural piece of shape information in the first form about a plurality of registered components, respectively, retained in the shape information retaining unit 13 (step S3).

Incidentally, the piece of feature information about each of the registered components obtained by the shape information retaining unit 13 at the above step S3 is beforehand extracted from a piece of shape information in the first form about each of a plurality of registered components (first extracting step), and retained in the shape information retaining unit 13.

The similar component retrieving unit 16 compares the piece of feature information about each of the registered components with the piece of feature information about the structural component, and calculates the degree of similarity (step S4).

The similarity component retrieving unit 16 determines the degree of similarity calculated at the above step S4 is not less than a threshold degree beforehand set (step S5). When determining that the degree of similarity is not less than the threshold degree (Yes route at step S5), the similar component retrieving unit 16 retrieves this registered component as a similar component of the structural component, and outputs a piece of shape information about this registered component to the display controlling unit 17 (step S6).

When determining that the degree of similarity is smaller than the threshold degree (No route at step S5), the similar component retrieving unit 16 does not execute the process at step S6.

Incidentally, the above steps S3 to S6 function as a retrieving step of retrieving registered components similar to the structural component as similar components from the shape information retaining unit 13.

The similar component retrieving unit 16 determines whether the process from step S3 to S6 has been executed on each of all the registered components retained in the shape information retaining unit 13 (step S7). When the process on all the registered components is not completed (No route at step S7), the similar component retrieving unit 16 proceeds to the above process at step S3. When the process on each of all the registered components is completed (Yes route at step S7), the similar component retrieving unit 16 terminates the process.

After the above process from step S1 to S7 is terminated, the shape information changing unit 19 of the designing unit 11 of the design aiding apparatus 10 changes the shape of the retrieved similar component if necessary so that shape information about the similar component agrees with that of the structural component (changing step), and adds the changed shape information in the first form to the CAD data.

The shape information registering unit 20 newly registers the shape information about the similar component changed by the shape information changing unit 19 in the shape information retaining unit (registering step).

Figure 8:
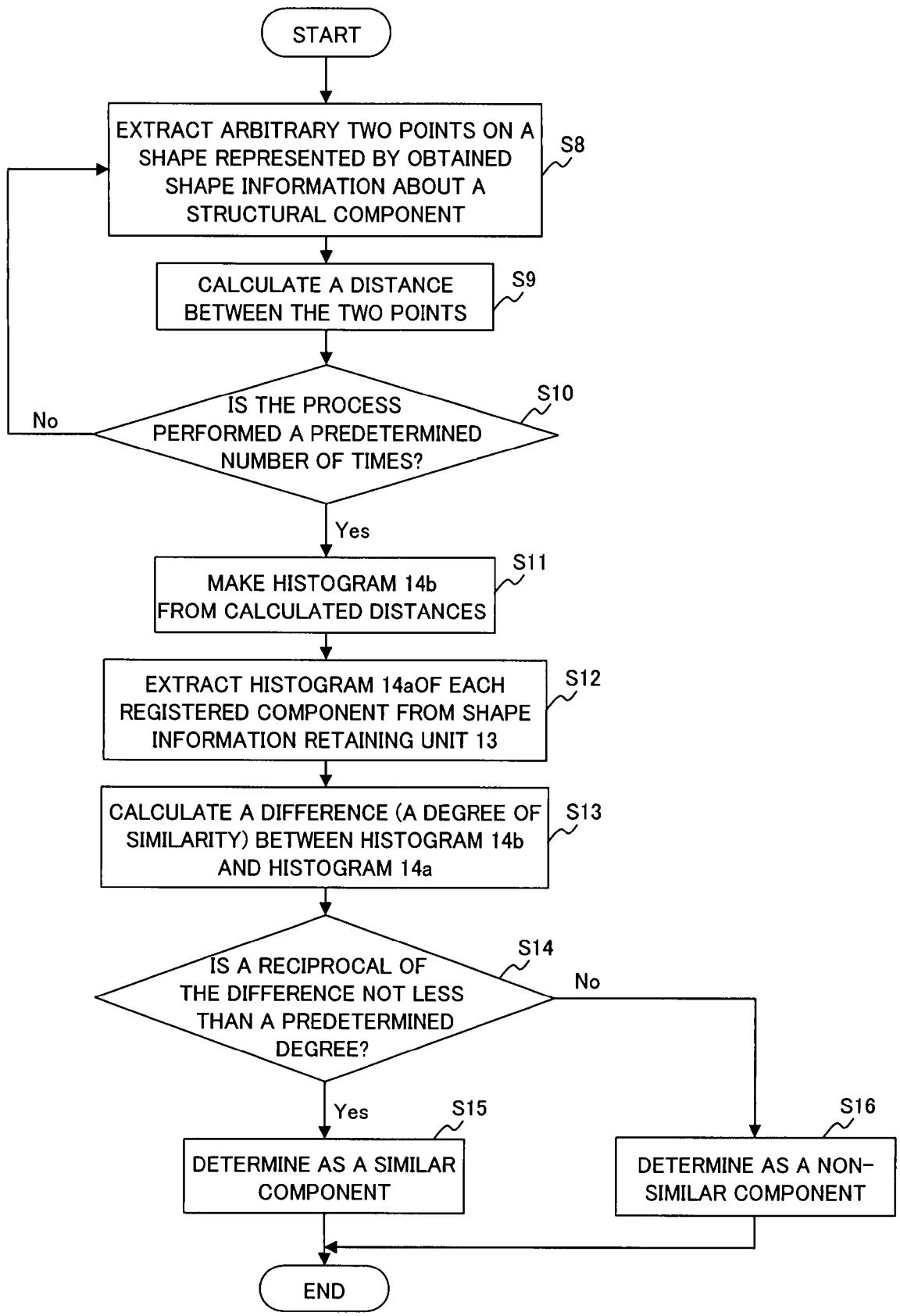
FIG. 8 is a flowchart showing an example of a procedure of a process performed by the feature information extracting unit and the similar component retrieving unit of the design aiding apparatus of the design aiding system according to the embodiment of this invention.

Next, an example of the procedure of the more practical operation of the feature information extracting unit 14 and the similar component retrieving unit 16 of the design aiding apparatus 10 (process at the steps S2 to S6 in FIG. 7) will be described with reference to a flowchart (steps S8 to S16) shown in FIG. 8. The example shown in FIG. 8 is a case where the feature information extracting unit 14 extracts feature information by using shape distributions.

The feature information extracting unit 14 first extracts arbitrary two points on a shape represented by shape information in the second form about a structural component generated by the 3D scanner 2 and obtained at the above step S1 (step S8), and calculates a distance between the extracted two points (step S9).

The feature information extracting unit 14 determines whether the process at the above steps S8 and S9 has been repeated a predetermined number of times (about a hundred thousand to a million times). When the feature information extracting unit 14 determines that the process has not been repeated a predetermined number of times (No route at step S10) the process returns to the process at the above step S8. The feature extracting unit 14 repetitively executes the process at the above steps S8 and S9 until determining that the process has been repeated a predetermined number of times (Yes route at step S10).

The feature information extracting unit 14 makes a histogram (frequency distribution of distances) 14b shown in FIG. 5(b) from distances obtained by calculation repeated a predetermined number of times (step S11).

The similar component retrieving unit 16 extracts a histogram (frequency distribution of distances) 14a shown in FIG. 5(a) of each registered component beforehand retained in the shape information retaining unit 13 (step S12), and calculates a reciprocal (or a product of a reciprocal of a difference and a coefficient) of a difference 14c in area between the histogram 14b and the histogram 14a as a degree of similarity (step S13). Note that when the difference 14c in area is "0", the similar component retrieving unit 16 calculates, for example, a maximum degree beforehand set as the degree of similarity so that this registered component (a similar component having the greatest degree of similarity) matches the structural component.

The similar component retrieving unit 16 determines whether the calculated reciprocal of the difference is not less than a predetermine degree beforehand set (that is, whether the degree of similarity is not less than the threshold degree) (step S14). When the reciprocal is not less than the predetermined degree (Yes route at step S14), the similar component retrieving unit 16 determines that this registered component is a similar component (step S15). When the reciprocal is below the predetermined degree (No route at step S14), the similar component retrieving unit 16 determines that this registered component is a non-similar component (step S16), and terminates the process.

As described above with reference to FIG. 7, the similar component retrieving unit 16 executes the process at the above steps S12 to S16 on every registered component retained in the shape information retaining unit 13.

According to the embodiment of this invention, in the design aiding system 1 (design aiding apparatus 10), the shape information obtaining unit 15 obtains a piece of shape information in the second form about a structural component generated by the 3D scanner 2, the feature information extracting unit 14 extracts a piece of feature information (histogram 14b) from the obtained shape information in the second form about the structural component, the similar component retrieving unit 16 calculates a degree of similarity of the piece of feature information about the structural component to each of plural pieces of feature information about respective plural registered components beforehand retained in the shape information retaining unit 13, and retrieves a registered component whose calculated degree of similarity is not less than a predetermined degree as a similar component of the structural component. Even if shape information about a structural component to be newly added to design data of a structure is in the second form that is difficult to be used as the design data (here, one generated by the 3D scanner 2), it is possible to allow, with ease, the shape information about the structural component to have the first form that is usable as the design data and be added to the design data, by using a similar component retrieved by the similar component retrieving unit 16, which is similar to or agrees with the structural component (that is, by replacing the similar component with the structural component).

From a piece of shape information in the first form and a piece of shape information in the second form which are different from each other, the feature information extracting unit 14 extracts two pieces of feature information which are comparable with each other and represent features of respective shapes. Whereby, the similar component retrieving unit 16 can retrieve a registered component that is similar to or agrees with a structural component in the second form as a similar component from the shape information retaining unit 13 on the basis of these pieces of feature information. When the retrieved similar component agrees with the structural component, the similar component retrieving unit 16 adds the shape information in the first form about the similar component as it is to the design data. Accordingly, it is possible to readily add the structural component in the second form as one in the first form to the design data without requiring a lot of labor or steps as does in the above-noted known techniques.

In the case where the retrieved component is similar to the structural component, when a little difference is allowed because of properties or an application of the design data, or characteristics or the like of the structural component, it is possible to add shape information about the similar component as it is to the design data. As this, it is possible to allow a component having a shape similar to that of the structural component in the second form to have the first form and be added to the design data, with ease.

When the retrieved similar component is similar to the structural component, shape information about the similar component is changed to agree with the shape of the structural component, and added to the design data. Whereby, it is possible for the structural component in the second form to have the first form and be readily added to the design data with less labor or a less number of steps as compared with the known techniques described hereinbefore.

Since the design aiding apparatus 10 has the shape information registering unit 20, it becomes possible to increase the number of registered components in the shape information retaining unit 13 to enrich the contents thereof, which leads to improvement of the rate of retrieval by the similar component retrieving unit 16 or the accuracy of the degree of similarity of the retrieved similar component.

Since the designing unit 11 of the design aiding apparatus 10 has the shape information changing unit 19, when shape information about a similar component cannot be added as it is to the design data because the shape or size of the similar component differs from that of the structural component, the shape information changing unit 19 changes the shape information about the similar component to match the shape of the similar component with the shape of the structural component, and adds the changed shape information about the similar component to the design data, whereby the shape information in the first form agreeing with the shape of the structural component in the second form can be readily added to the design data.

Since the shape information registering unit 20 adds the shape information about the similar component whose shape or size has been changed by the shape information changing unit 19 to the shape information retaining unit 13, it becomes possible to more enrich the contents of the shape information retaining unit 13, which leads to improvement of the rate or accuracy of retrieval by the similar component retrieving unit 16.

The feature information extracting unit 14 extracts frequency distribution of distances as feature information from shape information, the frequency distribution of distances being obtained by executing a process of extracting arbitrary two points on a shape represented by shape information in the first form and in the second form, and calculating the distance between these two points. Accordingly, it becomes possible to extract, with certainty, two pieces of information, which can be compared with each other, from a piece of shape information about a registered component and a piece of shape information about the structural component, which are in different forms.

The shape information retaining unit 13 retains plural pieces of feature information extracted from plural pieces of shape information about plural registered components, respectively, by the feature information extracting unit 14, where the plural pieces of feature information are correlated to the plural pieces of shape information, respectively. Accordingly, it becomes unnecessary to extract a piece of feature information about each of the registered components by the feature information extracting unit 14 whenever the similar component retrieving unit 16 executes the retrieving process, which can improve the speed and efficiency of the retrieving process.

[2] Others

Note that the present invention is not limited to the above embodiment, but may be modified in various ways without departing from the scope and spirit of the invention.

For example, the design aiding system 1 has the 3D scanner 2 in the above embodiment. However, this invention is not limited to this example. The design aiding system 1 may have a CT (Computerized Tomography) scan device or a CAD device in a different type other than the 3D scanner 2.

Accordingly, shape information in the second form about a structural component obtained by the shape information obtaining unit 15 of the design aiding apparatus 10 is not limited to what is generated by the 3D scanner 2, but may be intermediate data such as a series of section data obtained by the CT scan device, IGES (Initial Graphics Exchange Specification) outputted from a CAD device in a different type, or the like.

Figure 6:
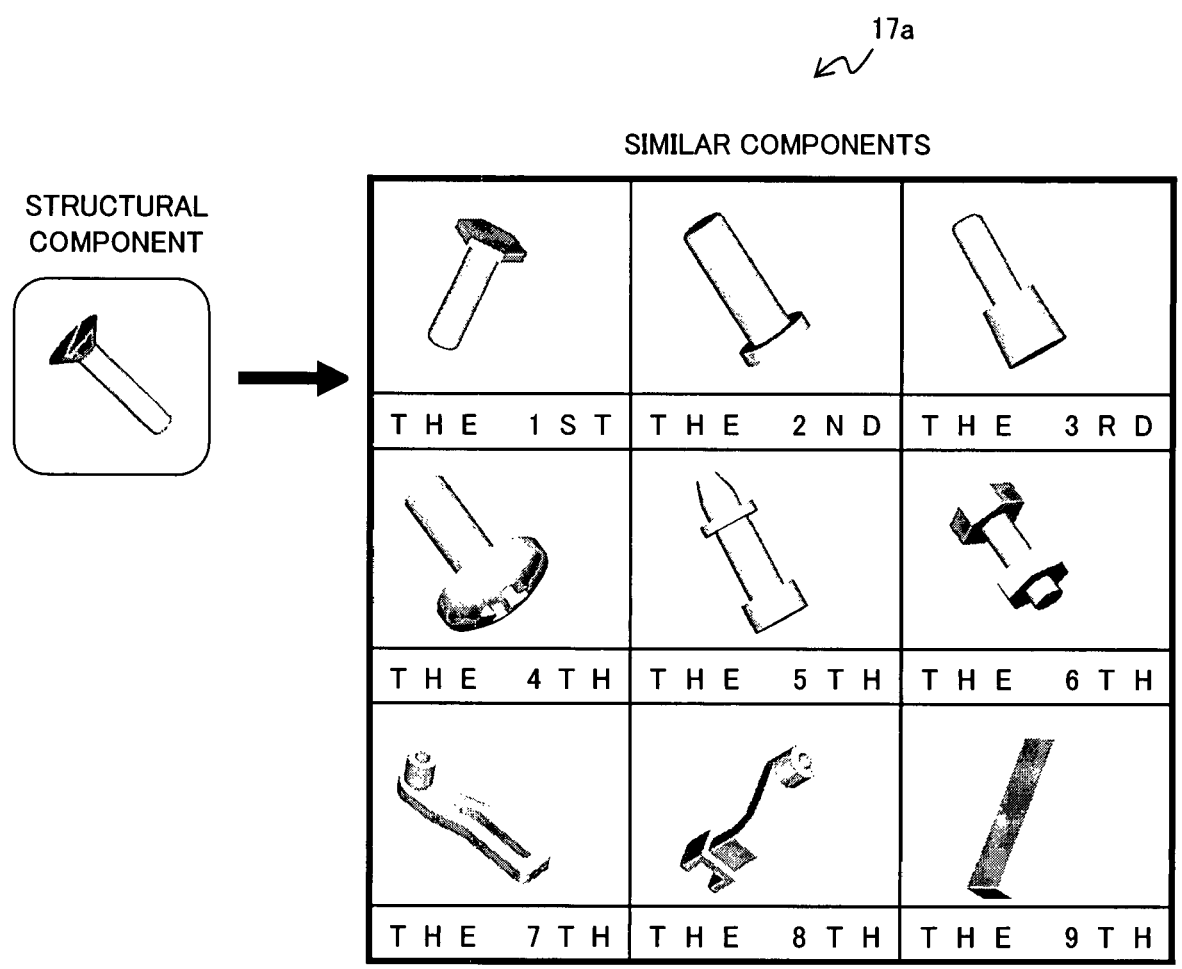
FIG. 6 is a diagram showing a retrieval result screen displayed on a displaying unit by a display controlling unit of the design aiding apparatus of the design aiding system according to the embodiment of this invention.

In the above embodiment, all registered components retrieved as similar components by the similar component retrieving unit 16 are outputted, as shown in FIG. 6. However, this invention is not limited to this example. It is possible to output one having the greatest degree of similarity among registered component retrieved as similar components by the similar component retrieving unit 16.

Figure 9:
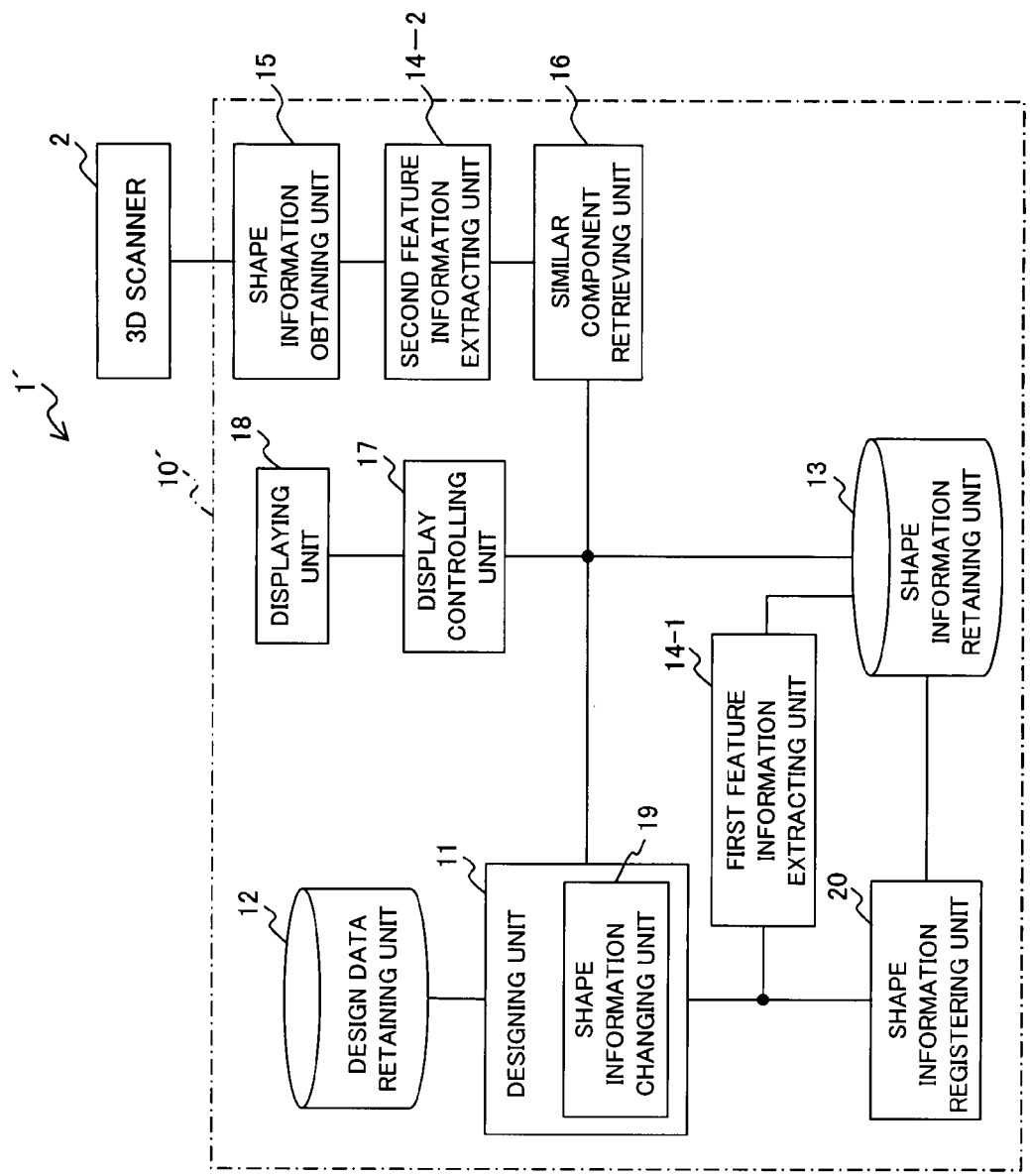
FIG. 9 is a block diagram showing a structure of a design aiding system according to a modification of this invention.

In the above embodiment, the feature information extracting unit 14 functions as the first extracting unit and the second extracting unit. However, this invention is not limited to this example. For example, as shown in FIG. 9, a design aiding apparatus 10' of a design aiding system 1' as being a modification of this invention comprises two feature information extracting units 14-1 and 14-2, a first feature information extracting unit 14-1 which is specialized to extract feature information from shape information about each of registered components registered in the shape information retaining unit 13, and a second feature information extracting unit 14-2 which is specialized to extract feature information from shape information about a structural component obtained by the shape information obtaining unit 15. This constitution can bring the same functions and effects as the above embodiment.

Figure 10:
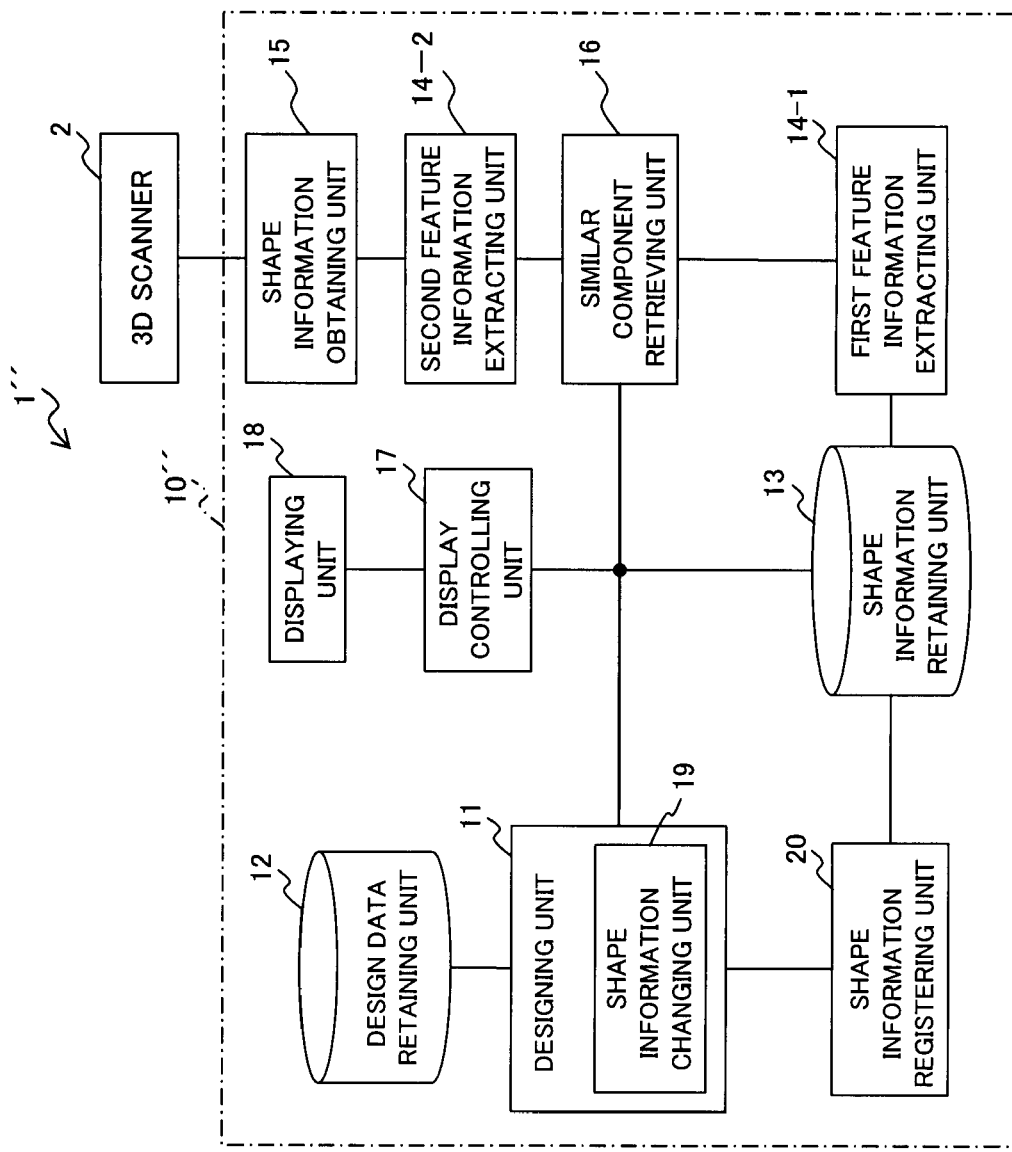
FIG. 10 is a block diagram showing a structure of a design aiding system according to another modification of this invention.

In the above embodiment, the shape information retaining unit 13 beforehand retains feature information about each of registered components. However, this invention is not limited to this example. As shown in FIG. 10, in a design aiding apparatus 10" of a design aiding system 1" as being another modification of this invention, the shape information retaining unit 13 does not retain the feature information about each of registered components, but the first feature information extracting unit 14-1 may extract feature information from shape information in the first form about each of registered components retained in the shape information retaining unit 13 whenever the shape information obtaining unit 15 obtains shape information about a structural component and the similar component retrieving unit 16 executes the retrieving process. This constitution may bring the same effects as the above embodiment.

Figure 11:
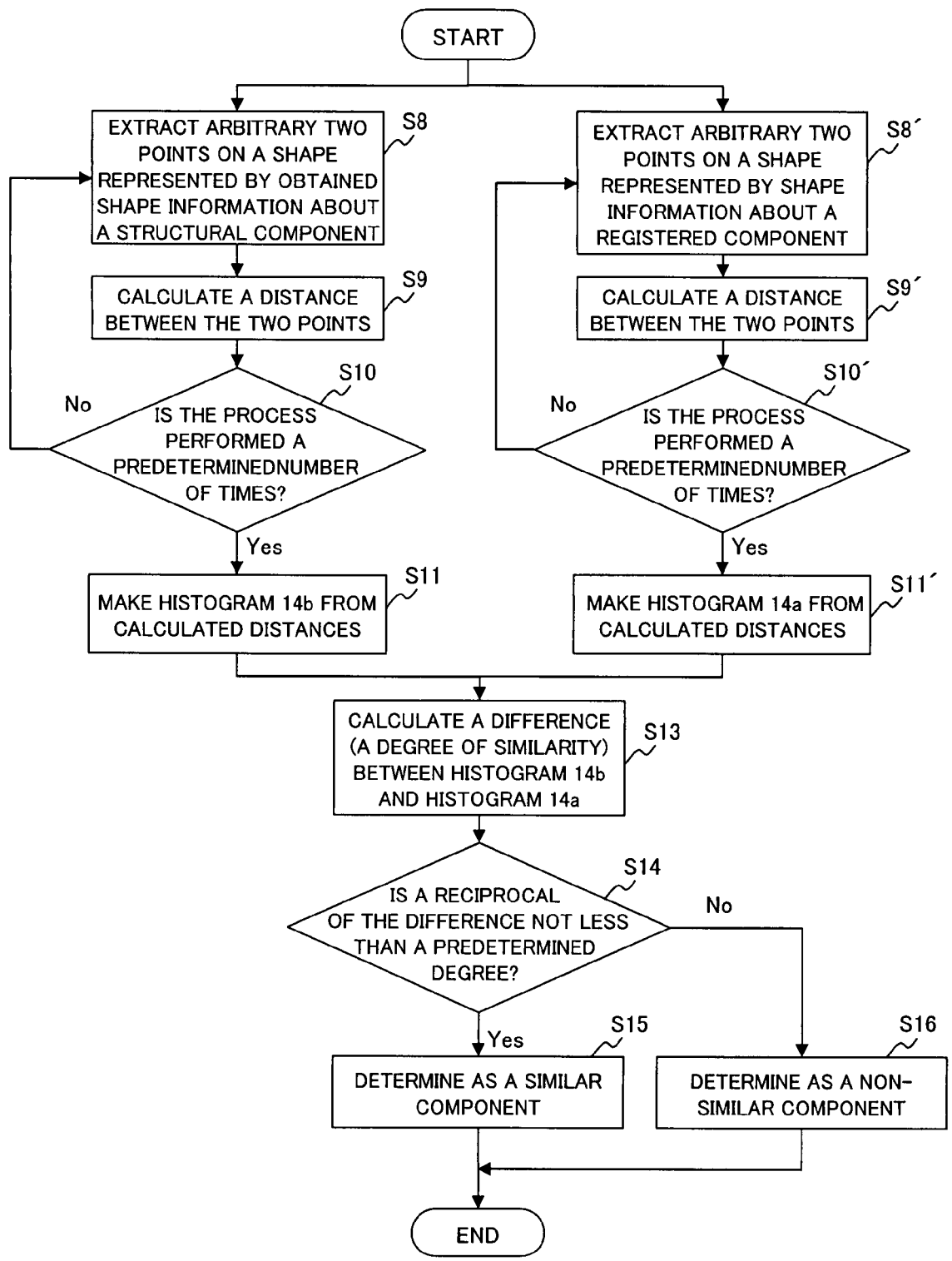
FIG. 11 is a flowchart showing an example of a procedure of a process performed by feature information extracting units and the similar component retrieving unit of the design aiding apparatus of the design aiding system shown in FIG. 10 according to the modification of this invention.

At this time, in a procedure of the operations of the first feature information extracting unit 14-1, the second feature information extracting unit 14-2 and the similar component retrieving unit 16 in the design aiding apparatus 10", as shown in FIG. 11, a process (steps S8' to S11') of extracting a piece of feature information from a piece of shape information in the first form about a registered component retained in the shape information retaining unit 13 by the first feature information extracting unit 14-1 is executed in parallel to the process at steps S8 to S11, in addition to the processing steps S8 to S16 shown in FIG. 8.

Note that it is not always necessary that the process (steps S8' to S11') of extracting a piece of feature information about a registered component by the first feature information extracting unit 14-1 is executed in parallel to the process (step S8 to S1) of extracting a piece of feature information about the structural component by the second feature information extracting unit 14-2, but either one of these processes may be executed in prior to the other.

The functions of the designing unit 11, the feature information extracting unit 14, the first feature information extracting unit 14-1, the second feature information extracting unit 14-2, the shape information obtaining unit 15, the similar component retrieving unit 16, the display controlling unit 17, the shape information changing unit 19 and the shape information registering unit 20 may be realized by executing a predetermined program (design aiding program) by a computer (including CPU, information processing apparatus, various terminals).

This program is provided in a form in which the program is recorded on a computer readable recording medium such as a flexible disk, a CD (CD-ROM, CD-R, CD-RW or the like), a DVD (DVD-ROM, DVD-RAM, DVD-R, DVD-RW, DVD+R, DVD+RW or the like) or the like. In this case, the computer reads the design aiding program from the recording medium, transfers the program to the internal storage or an external storage to store it, and uses the same. The program may be recorded on a storage (recording medium) such as a magnetic disk, an optical disk, a magneto-optical disk or the like, and provided to the computer from the storage over a communication line.

Here, the computer is a concept including hardware and an OS (Operating System), standing for hardware operating under control of the OS. When the OS is unnecessary and the application program solely operates the hardware, the hardware itself corresponds to the computer. The hardware has at least a microprocessor such as a CPU or the like, and a means for reading the computer program recorded on the recording medium.

The application program as being the above design aiding program includes program codes for making the computer realize the functions of the designing unit 11, the feature information extracting unit 14, the first feature information extracting unit 14-1, the second feature information extracting unit 14-2, the shape information obtaining unit 15, the similar component retrieving unit 16, the display controlling unit 17, the shape information changing unit 19 and the shape information registering unit 20. A part of these functions may be realized by not the application program but the OS.

As the recording medium in the embodiment of this invention, there may be used any one of various kinds of computer readable media such as an IC card, a ROM cartridge, a magnetic tape, a punched card, an internal storage (memory such as RAM, ROM or the like) of a computer, an external storage, a printed matter on which codes such as bar codes or the like are printed and so forth, other than a flexible disk, a CD, a DVD, a magnetic disk, an optical disk and a magneto-optical disk mentioned above.

What is claimed is:

1. A design aiding apparatus comprising:
    a retaining unit to retain plural pieces of shape information in a first form about respective plural registered components which may constitute a structure;
    a first extracting unit to extract plural pieces of feature information from the plural pieces of shape information in the first form about the plural registered components, respectively, retained in said retaining unit;
    an obtaining unit to obtain a piece of shape information in a second form about a structural component constituting the structure;
    a second extracting unit to extract a piece of feature information from the piece of shape information in the second form about the structural component obtained by said obtaining unit; and
    a retrieving unit to calculate degrees of similarity of each of the plural pieces of feature information about the respective registered components extracted by said first extracting unit to the piece of feature information about the structural component extracted by said second extracting unit, and retrieving a registered component whose calculated degree of similarity is equal to or larger than a predetermined degree as a similar component of the structural component, wherein said first extracting unit and said second extracting unit extract frequency distribution of distances from the shape information as the feature information by extracting arbitrary two points on a shape represented by shape information in the first form or the second form and calculating a distance between the two points a predetermined number of times.

2. The design aiding apparatus according to claim 1 further comprising:
    a registering unit to register shape information in the first form in said retaining unit.

3. The design aiding apparatus according to claim 2 further comprising:
    a changing unit to change a piece of shape information about the similar component retrieved by said retrieving unit;
    said registering unit registers the piece of shape information about the similar component changed by said changing unit in said retaining unit.

4. The design aiding apparatus according to claim 1, wherein said retaining unit retains the plural pieces of feature information extracted from the respective pieces of shape information by said first extracting unit, where the plural pieces of feature information are correlated to the plural pieces of shape information in the first form about the registered components, respectively.

5. The design aiding apparatus according to claim 1, wherein the first form is a form including information necessary for computer-aided design of the structure.

6. The design aiding apparatus according to claim 1, wherein the second from is a form in which information necessary for computer-aided design of the structure is undefined.

7. A design aiding method comprising:
first extracting plural pieces of feature information from plural pieces of shape information in a first form about a plurality of registered components, respectively, in a retaining unit retaining the plural pieces of shape information in the first form about the respective plural registered components which may constitute a structure;
obtaining a piece of shape information in a second form about a structural component which constitutes the structure;
second extracting a piece of feature information from the shape information in the second form about the structural component obtained at said obtaining; and
calculating degrees of similarity of each of the plural pieces of feature information about the respective plural registered components extracted at said first extracting step to the piece of feature information about the structural component extracted at said second extracting step, and retrieving a registered component whose calculated degree of similarity is equal to or larger than a predetermined degree as a similar component of the structural component, wherein, at said first extracting and said second extracting, frequency distribution of distances is extracted from the shape information as the feature information, the frequency distribution of distances being obtained by extracting arbitrary two points on a shape represented by shape information in the first form or the second form and calculating a distance between the two points a predetermined number of times; and
wherein the method is performed using a processor or a computer.

8. The design aiding method according to claim 7 further comprising:
changing a piece of shape information about the similar component retrieved by said retrieving unit; and
registering the piece of shape information about the similar component changed at said changing step in said retaining unit.

9. The design aiding method according to claim 7, wherein the first form is a form including information necessary for computer-aided design of the structure.

10. The design aiding method according to claim 7, wherein the second form is a form in which information necessary for computer-aided design of the structure is undefined.

11. A computer readable recording medium recorded thereon a design aiding program making a computer realize a function of retrieving a registered component similar to a structural component constituting a structure from a retaining unit retaining plural pieces of shape information in a first form about respective plural registered components which may constitute the structure, said design aiding program making said computer function as:

a first extracting unit to extract plural pieces of feature information from the plural pieces of shape information in the first form about the plural registered components, respectively, retained in said retaining unit;
an obtaining unit to obtain a piece of shape information in a second form about a structural component constituting the structure;
a second extracting unit to extract a piece of feature information from the piece of shape information in the second form about the structural component obtained by said obtaining unit; and
a retrieving unit to calculate degrees of similarity of each of the plural pieces of feature information about the respective registered components extracted by said first extracting unit to the piece of feature information about the structural component extracted by said second extracting unit, and retrieving a registered component whose calculated degree of similarity is equal to or larger than a predetermined degree as a similar component of the structural component, wherein said first extracting unit and said second extracting unit extract frequency distribution of distances from the shape information as the feature information by extracting arbitrary two points on a shape represented by shape information in the first form or the second form and calculating a distance between the two points a predetermined number of times.

12. The computer readable recording medium recorded thereon a design aiding program according to claim 11, wherein the design aiding program makes the computer function as a registering unit to register shape information in the first form in said retaining unit.

13. The computer readable recording medium recorded thereon a design aiding program according to claim 12, wherein the design aiding program makes the computer function as a changing unit to change a piece of shape information about the similar component retrieved by said retrieving unit; and
the design aiding program makes the computer so that said registering unit registers the piece of shape information about the similar component changed by said changing unit in said retaining unit.

14. The computer readable recording medium recorded thereon a design aiding program according to claim 11, wherein the first form is a form including information necessary for computer-aided design of the structure.

15. The computer readable recording medium recorded thereon a design aiding program according to claim 11, wherein the second form is a form in which information necessary for computer-aided design of the structure is undefined.

16. A design aiding system comprising:
a generating apparatus to generate a piece of shape information about a structural component constituting a structure; and
a design aiding apparatus to prepare design data of the structure by using the piece of shape information about the structural component generated by said generating apparatus;
said design aiding apparatus comprising:
a retaining unit to retain plural pieces of shape information in a first form about respective plural registered components which may constitute the structure;
a first extracting unit to extract plural pieces of feature information from the plural pieces of shape information in the first form about the plural registered components, respectively, retained in said retaining unit;

an obtaining unit to obtain the piece of shape information in a second form about the structural component generated by said generating apparatus;

a second extracting unit to extract a piece of feature information from the piece of shape information in the second form about the structural component obtained by said obtaining unit; and a retrieving unit to calculate degrees of similarity of each of the plural pieces of feature information about the respective registered components extracted by said first extracting unit to the piece of feature information about the structural component extracted by said second extracting unit, and retrieving a registered component whose calculated degree of similarity is equal to or larger than a predetermined degree as a similar component of the structural component, wherein said first extracting unit and said second extracting unit extract frequency distribution of distances from the shape information as the feature information by extracting arbitrary two points on a shape represented by shape information in the first form or the second form and calculating a distance between the two points a predetermined number of times.

17. The design aiding system according to claim 16, wherein said design aiding apparatus further comprises:

a changing unit to change a piece of shape information about the similar component retrieved by said retrieving unit; and a registering unit to register the piece of shape information about the similar component changed by said changing unit in said retaining unit.

* * * * *